United States Patent
Takahashi et al.

[11] Patent Number: 6,041,827
[45] Date of Patent: Mar. 28, 2000

[54] MULTI-LAYERED METALLIC PIPE AND METHOD OF COATING THE METALLIC PIPE

[75] Inventors: Teruhisa Takahashi, Mishima; Masaaki Akiyama, Sunto-gun; Masashi Kajiyama, Tagata-gun, all of Japan

[73] Assignee: Usui Kokusai Sangyo Kaisha Limited, Shizuoka Prefecture, Japan

[21] Appl. No.: 09/064,193

[22] Filed: Apr. 22, 1998

[30] Foreign Application Priority Data

Apr. 25, 1997 [JP] Japan ..................................... 9-123529

[51] Int. Cl.[7] ...................................................... F16L 11/11
[52] U.S. Cl. .......................... 138/139; 138/121; 138/143; 138/146
[58] Field of Search .................................... 138/145, 146, 138/142, 143, 121, 139

[56] References Cited

U.S. PATENT DOCUMENTS

| | | | |
|---|---|---|---|
| 3,771,570 | 11/1973 | Coleman | 138/139 |
| 3,877,490 | 4/1975 | Tsubouchi et al. | 138/145 |
| 3,963,055 | 6/1976 | DeRosa | 138/89 |
| 4,481,239 | 11/1984 | Eckner | 138/145 |
| 4,839,204 | 6/1989 | Yoshino et al. | 138/145 |
| 4,853,297 | 8/1989 | Takahashi et al. | 138/139 |
| 4,944,972 | 7/1990 | Blembereg | 138/128 |
| 5,051,285 | 9/1991 | Borzakian | 138/143 |
| 5,520,223 | 5/1996 | Iorio et al. | 138/143 |
| 5,662,974 | 9/1997 | Andrenacci et al. | 138/146 |

*Primary Examiner*—James Hook
*Attorney, Agent, or Firm*—Arent Fox Kintner Plotkin & Kahn PLLC

[57] ABSTRACT

A multi-layered metallic pipe having resistances to the chipping of pebbles and splashing of muddy water while driving a vehicle and excellent corrosion resistances. The multi-layered metallic pipe is piped without scraping and does not need an insulator. The multi-layered metallic pipe includes a metallic pipe having a relatively small plated diameter with a film made of zinc, aluminum or a zinc/aluminum based alloy on the outer circumference of the metallic pipe. A first layer of a polyamide resin, a polyvinyl fluoride, or a polyvinylidene fluoride having a film thickness of 20 to 50 microns is applied to the plated film. A second layer made of an extrudible resin having a film thickness of 100 microns to 1.0 millimeter and a chipping resistance is coated over the first layer along an entire length of the first layer. The second layer is formed to have stepped portions of different thickness. A method of coating the multi-layered metallic pipe includes forming the first layer on the outer circumference of the plated metallic pipe and the subsequent step of forming the second layer with stepped portions of different thicknesses by extruding the resin at an intermittently different feed rate.

18 Claims, 3 Drawing Sheets

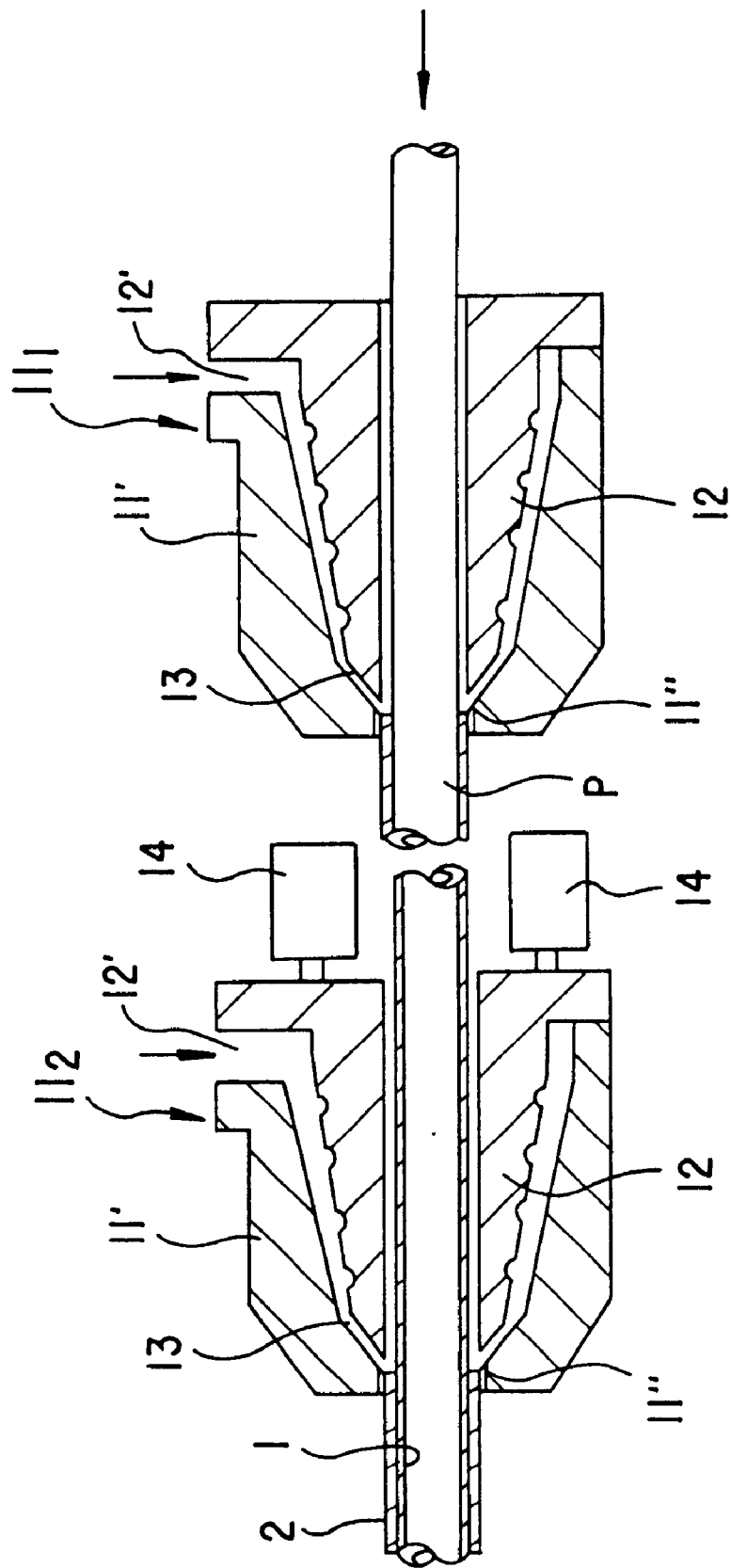

MULTI-LAYERED METALLIC PIPE AND METHOD OF COATING THE METALLIC PIPE

BACKGROUND OF THE INVENTION

1. Field of the Invention

The present invention relates to a metallic pipe having a relatively small diameter of about 20 mm or less and arranged as a piping such as the brake pipe or fuel pipe of an automobile in a lower portion of the body. More particularly, the invention relates to both a metallic pipe having on its outer circumference multiple sheaths having resistances to the chipping (of pebbles) and splashing (of muddy water) during a running of the automobile and excellent corrosion resistances, and a method of sheathing the metallic pipe.

Here in the specification, the term "stepped" generally means generally upright, sloped or curved faces at the two longitudinal sides of the metallic pipe.

2. Description of the Prior Art

As the coated metallic pipe of this kind, there have been known in the prior art: a metallic pipe which is prepared by forming a chromate film, if necessary, on a Zn or Zn/Ni plated film applied to the outer circumference of the metallic pipe, by coating the chromate film with polyvinyl fluoride (PVF) having a thickness of about 20 microns, and by covering the coating with a heat-shrinkable tube; and a metallic pipe which is prepared by extruding a polyamide resin (PA) such as PA11 or PA12 having a thickness of about 200 microns on a Zn or Zn/Al plated film applied to the outer circumference of the metallic pipe.

In the former prior art. however, the expensive heat-shrinkable tube is used to raise the production cost, and the step of heating to shrink the heat-shrinkable tube applied to the polyvinyl fluoride layer is required to trouble the manufacture and deteriorate the productivity. In the latter prior art. on the other hand, the use of the single-layered thick film of a polyamide resin causes the defects such as the pin holes to continue in the thickness direction thereby to raise a problem that the corrosion resistance is deteriorated.

When the coated metallic pipe of the two prior arts is to be arranged in an automobile, moreover, the overcoat layer has to be scraped off when the metallic pipe is worked at its two ends for joints. This necessity raises a problem that the cutting edge for the scraping operations damages the outer circumference or the protective film of the metallic pipe thereby to deteriorate the corrosion resistance.

When the coated metallic pipe of the latter prior art is to be arranged in an automobile, it is mounted to its mating member through an insulator. Because of the large thickness of the coated layer, the insulator has to be especially large-sized. and the metallic pipe has a large diameter to raise problems that the bending radius is enlarged and that the piping cannot be made in a predetermined space.

SUMMARY OF THE INVENTION

An object of the invention is to solve the aforementioned problems of the prior art and to provide both a multi-layered metallic pipe, which has resistances to the chipping (of pebbles) and splashing (of muddy water) during a running of a vehicle and excellent corrosion resistances and which can be piped merely by using nuts or the like but without any scraping and can use a clamping member such as an insulator of the prior art while sparing the space, and a method of coating the metallic pipe.

In order to achieve the above-specified object, according to a first aspect of the invention, there is provided a multi-layered metallic pipe comprising: a metallic pipe having a relatively small diameter; a plated film made of Zn, Al or its based alloy and formed on the outer circumference of the metallic pipe; a first layer applied to the plated film and made of PA, PVF or polyvinylidene fluoride (PVdF) having a film thickness of 20 to 50 microns; and a second layer coating the first layer all over its length and made of an extrusible resin having a film thickness of 100 microns to 1.0 mm and a chipping resistance, and the second layer is formed to have stepped portions of different thicknesses. Moreover, the first layer is made of a combination of an epoxy resin primer or a double coating of PVF or PVdF.

According to a second aspect of the invention, there is provided a method of coating a multi-layered metallic pipe, comprising: the step of forming a first layer of a thin film of PA, PVF or PVdF on the outer circumference of a metallic pipe which has been plated in advance with Zn, Al or its based alloy; and the subsequent step of forming a second layer of a thick film having stepped portions of different thicknesses all over the length of the first layer by extruding a resin having a chipping resistance at an intermittently different feed rate.

According to the invention, there is provided a multi-layered metallic pipe comprising: a metallic pipe plated in advance on its outer circumference with a plated film made of Zn, Al or its based alloy: a first layer made of a polyamide resin (PA), polyvinyl fluoride (PVP) or polyvinylidene fluoride (PVdF) and having a film thickness of 20 to 50 microns; and a second layer applied to coat the first layer and made of an extrusible resin having a film thickness of 100 microns to 1.0 mm and a chipping resistance. and the second layer is formed to have stepped portions having different thicknesses. As a result, the defects such as the pin holes, if any in the first layer, can be remedied and prevented by the second layer from continuing in the thickness direction of the multiple layers so that the chipping and splashing resistances can be improved and so that an excellent corrosion resistance can be exhibited. Since the second layer is formed to have the stepped portions of different thicknesses, moreover, the second layer is thinned at a desired position, e.g., at the worked terminal portion, the portion to be equipped with a clamping member such as the insulator. or the bent portion, so that the works of scraping the worked terminal portion can be eliminated to enhance the productivity. As a result, the clamping member such as the insulator of the prior art can be employed to spare the space.

BRIEF DESCRIPTION OF THE DRAWINGS

FIG. 5 is an explanatory schematic section showing an extrusion die according to one embodiment of the extrusion-coating apparatus according to the coating method of the invention.

DETAILED DESCRIPTION OF THE INVENTION

Figure 1:
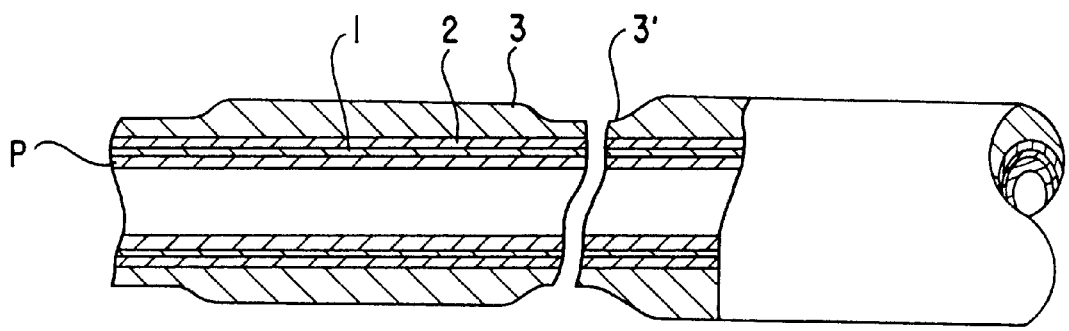
FIG. 1 is a partially cut-away section showing one end of the individual pipe components of a multi-layered metallic pipe manufactured by a coating method of the invention.
Figure 2:
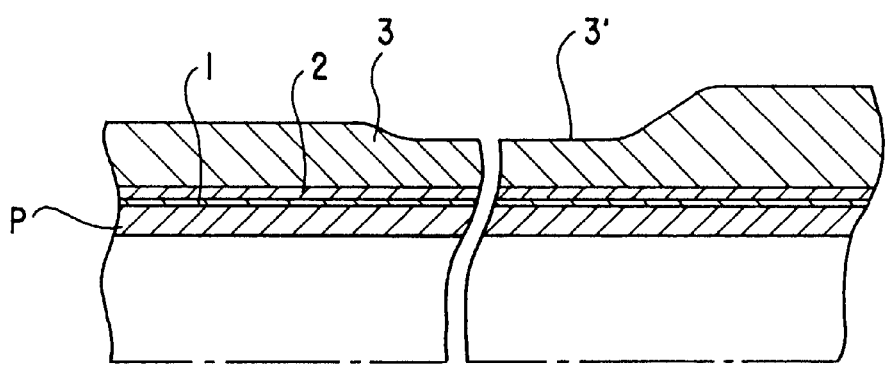
FIG. 2 is an enlarged half section showing an essential portion of FIG. 1.
Figure 3:
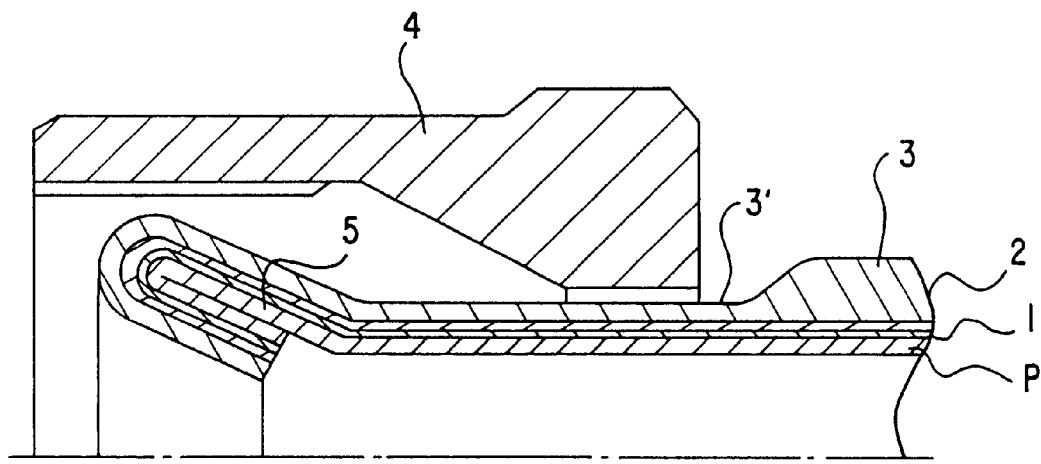
FIG. 3 is an enlarged half section showing one embodiment of a worked terminal portion.

The invention will be described with reference to the accompanying drawings. In FIGS. 1 to 5, reference letter P designates a metallic pipe which is made of a seamless pipe, a semi-seamless pipe, a seam-welded pipe or a soldered, or welded pipe having a plating film of a copper alloy and having one or more turns. The metallic pipe P has an external diameter of about 20 mm or less. The metallic pipe P has on its outer circumference with a plate film 1 of Zn, Al or its based alloy and is further plated, if desired, on the surface of the plated film 1 with yellow or olive chromate.

The plated film 1 is specifically made of Zn, Zn/Ni or Zn/Al and is prepared by an electric plating method or a hot-dipping method to have an average thickness of about 8 to 25 microns. Here will be described the reason why the plated film has the above-specified thickness range. A sufficient corrosion resistance cannot be achieved if the film thickness is less than 8 microns, and the plated film is cracked by the subsequent step such as the bending step to deteriorate the corrosion resistance if the film thickness is more than 25 microns.

Next, on the plated film 1, there is formed a first layer 2 which is made of a polyamide resin (PA) such as PA6, PA11 or PA12, polyvinyl fluoride (PVF) or polyvinylidene fluoride (PVdF) to have a thickness of 20 to 50 microns by a coating method such as an extruding, spraying, showering, dipping, brushing or powder-coating method. A sufficient adhesion strength cannot be achieved between the first layer 2 and the plated layer 1 if the first layer 2 has a film thickness of less than 20 microns, and the adhesion strength is not improved any more if the film thickness is more than 50 microns.

Here, the first layer is formed of a single layer of polyamide resin (PA). polyvinyl fluoride (PVF) or polyvinylidene fluoride (PVdF). If the thickness is within the above-specified range, however, the first layer can be formed either by coating with an epoxy resin primer of bisphenol type, dihydroxyphenol type or novolak type by the coating method such as the extruding, spraying, showering, dipping, brushing or powder-coating method and subsequently by coating the coating with the PVF or PFdF, or by coating with the PVF doubly by the aforemenioned method.

On the first layer 1 all over its length, moreover, there is formed a second layer 3 by extruding an extrusible resin having a chipping resistance such as polypropylene (PP), polyethylene (PE) or the aforementioned polyamide resin (PA) to have film thicknesses ranging from 100 microns to 1.0 mm and stepped to have different values in the axial direction.

By this second layer, defects such as pin holes, if any in the first layer 2, can be remedied and prevented from continuing from the inner face to the outer face so that the corrosion resistance can be improved.

Here will be described the reason why the film thickness of the second layer 3 is restricted to the above-specified range. If the film thickness is less than 100 microns, a sufficient chipping resistance cannot be achieved even with a nut being disposed at the worked terminal portion or an insulator being disposed at the intermediate portion. If the film thickness is more than 1.0 mm, on the other hand, the improvement in the corrosion resistance cannot be different, but still the worse the multi-layered coating may be cracked at the bending step.

For forming the second layer, there can be used an extrusion-coating apparatus, as shown in FIG. 5. Specifically, reference numeral 112 designates an extrusion die for the coating method. A die body 11' and a guide core 12 keeps a feed clearance 13 leading to a resin inlet 12' between their opposed internal circumferences. The extrusion die $11_2$ has a nozzle exit 11" in the leading end portion at the side of the die body 11'. In the guide core 12, the metallic pipe P is moved forward by the (not-shown) feeder using rolls. At the side of the extrusion die $11_2$, there is attached to the guide core 12 a hydraulic device 14 for moving the guide core finely back and forth in synchronism with the movement of the metallic pipe P thereby to control the feed clearance 13. In order to form a thinner film portion 3' at a desired position, e.g. at the worked terminal portion, the portion to be clamped by the insulator, the portion demanded to have neither chipping nor splashing resistance, or the bent portion, the feed of the resin is changed to sheath the second layer 3 having a stepped portion having a different thickness.

At the second layer 3, moreover, the thickness of not only the thicker film portion but also the thinner film portion 3' can be variously changed depending upon the chipping degree or the demanded corrosion resistance. For example, the worked terminal portion can be extremely thinned, and the portion, as not demanded to have the chopping resistance and the splashing resistance, or the bent portion can be made thicker.

Reference numeral $11_1$ appearing in FIG. 5 designates an extrusion die of the extrusion-coating apparatus for extruding the first layer 2. This extrusion die $11_1$ is given a construction substantially similar to that of the foregoing extrusion die $11_2$. However, the extrusion die $11_1$ is not equipped with the hydraulic device 14 for moving the guide core 12 finely back and forth to control the feed clearance 13. As a result, this feed clearance 13 is always opened so that the resin is fed at a constant rate from the nozzle exit 11", Alternatively, it is possible, if desired, to employ a single extrusion-coating apparatus for extruding and sheathing the first layer 2 and the second layer 3 at the same time.

Figure 4:
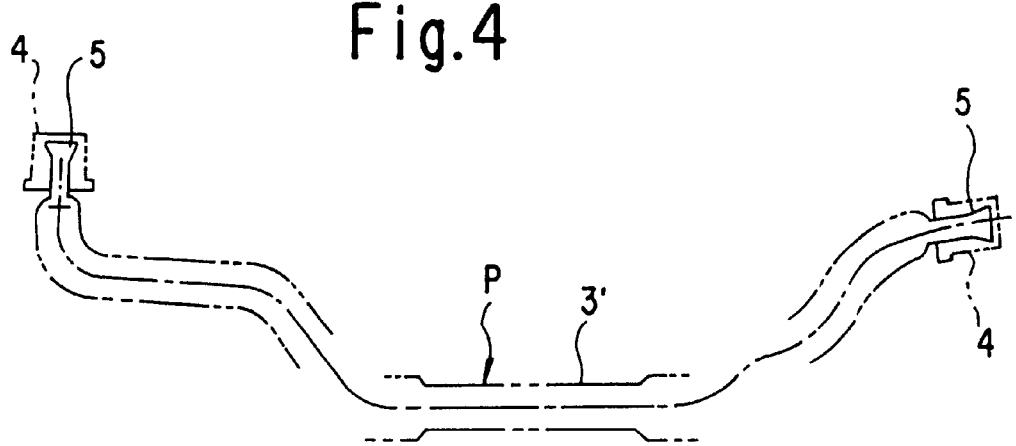
FIG. 4 is a diagram showing a piped state of the multi-layered pipe of the invention.

The metallic pipe P thus having the multi-layered layers on its outer circumference is fitted with joint nuts 4 at the thinner film portions 3' of its second layer, as formed at its end portions. After this, the metallic pipe P is doubly flared, as indicated at 5, as one example of the terminal works shown in FIG. 3, and is then subjected to predetermined bending works, as shown in FIG. 4.

EXAMPLES

Examples of the invention will be described in connection with Comparisons.

Example 1

A hoop material SPCC having a copper plated layer of a thickness of 3 microns on its two faces was employed to form a doubly wound steel pipe having an external diameter of 8 mm, a thickness of 0.7 mm and a length of 30 m, This doubly wound steel pipe was plated on its outer circumference with a film of Zn having an average thickness of 25 microns by employing an acid electrolyte containing zinc sulfate as a major component and an organic additive at a temperature of 55 to 60 degrees centigrade and by supplying an electric power of a current density of 60 A/dm$^2$ for 2 minutes. Next, the Zn plated film was treated on its surface with chromate. After this, the film was dipped in a liquid, in which polyvinyl fluoride had been dispersed in diethylene phthalate, and was coated with a polyvinyl fluoride layer having a thickness of 30 microns by heating and drying it at 350 degrees centigrade for 60 seconds.

In order to open/close the feed clearance, as shown in FIG. 5, over the polyvinyl fluoride, the extrusion-coating apparatus having the hydraulic device for moving the guide core finely back and forth was employed to extrude a polypropylene layer having a thickness of 1 mm.

The multi-layered metallic pipe thus prepared was cut to a length of 300 mm. This specimen was subjected to the soft chipping and hard chipping tests under the conditions enumerated in Table 1. The metallic pipe was dipped in a graduated cylinder of 100 milliliters, which had been given a liquid level of 16 cm by pouring thereinto 100 milliliters of 1:1 hydrochloric acid. and was taken out after a rest of 10 minutes for atomic absorption analyses. The analytical results are enumerated in Table 2.

Example 2

The double wounded steel pipe, as prepared as in Example 1, was plated on its outer circumference with the Zn film as in Example 1. Next, the steel pipe having the Zn plated film was dipped in a paint, which had been prepared from a bisphenol type epoxy resin and a pigment with a solvent, and was coated on its outer circumference with an epoxy resin layer having a thickness of about 5 microns by heating it at 350 degrees centigrade for 60 seconds. Next, the steel pipe was dipped in a liquid, in which polyvinyl fluoride had been dispersed into the diethyl phthalate, and was coated with polyvinyl fluoride by heating and drying it at 350 degrees centigrade for 60 seconds to form a polyvinyl fluoride layer having a thickness of about 15 microns thereby to form the first layer having a total film thickness of about 20 microns.

On the first layer including the polyvinyl fluoride layer, there was further formed the polypropylene layer having the film thickness of 1 mm by the extruding method as in Example 1.

The multi-layered metallic pipe thus prepared was subjected to measurements similar to those of Example 1, and the results are enumerated in Table 2.

Example 3

The doubly wound steel pipe. as prepared as in Example 1, was plated on its outer circumference with the Zn film as in Example 1. On the outer circumference of the steel pipe having the Zn plated film, there was formed a polyamide resin layer having a thickness of 50 microns by adopting PA12 as the polyamide resin and by employing the extrusion-coating apparatus shown in FIG. 5. Next, a polypropylene layer having a thickness of 1 mm similar to that of Example 2 was formed by the extruding method.

The multi-layered metallic pipe thus prepared was subjected to measurements similar to those of Example 1, and the results are enumerated in Table 2.

Example 4

The double wounded steel pipe, as prepared as in Example 1, was plated on its outer circumference with the Zn/Ni plated film having an average film thickness of 8 microns by employing a Zn/Ni alloy plating bath (e.g., Zn-10MU of Ebara Cozyright) made of a chlorinating bath. On the outer circumference of the steel pipe having the Zn/Ni plated film. there were formed a polyamide resin layer having a thickness of 50 microns and a polypropylene layer having a thickness of 1 mm as in Example 3.

The multi-layered metallic pipe thus prepared was subjected to measurements similar to those of Example 1, and the results are enumerated in Table 2.

Example 5

Multiple sheathes were formed on the outer circumference of the steel pipe as in Example 4 excepting that the plated film had been formed to have an average thickness of about 20 microns by the ordinary molten plating method.

The multi-layered metallic pipe thus prepared was subjected to measurements similar to those of Example 1, and the results are enumerated in Table 2.

Example 6

The double wounded steel pipe, as prepared as in Example 1, was plated on its outer circumference with the Zn film as in Example 1. Then, the steel pipe having the Zn plated film applied with chromate coating followed by epoxy resin primer coating was dipped in solution of dimethyl phthalate dispersed with polyvinylidene fluoride followed by heating it at 350 degrees centigrade for 60 seconds to form a polyvinyl fluoride layer having a thickness of about 30 microns.

On the first layer including the polyvinylidene fluoride layer, there was further formed the polypropylene layer having the film thickness of 1 mm by the extruding method as in Example 1.

The multi-layered metallic pipe thus prepared was subjected to measurements similar to those of Example 1, and the results are enumerated in Table 2.

Comparison 1

The double wounded steel pipe. as prepared as in Example 1, was plated on its outer circumference with the Zn film. Next, the steel pipe having the Zn plated film was dipped in a paint, which had been prepared from a bisphenol type epoxy resin and a pigment with a solvent, and was coated on its outer circumference with an epoxy resin layer having a thickness of about 5 microns by heating it at 300 degrees centigrade for 60 seconds. Next, the steel pipe was dipped in a liquid, in which polyvinyl fluoride had been dispersed into the diethyl phthalate, and was coated with polyvinyl fluoride by heating and drying it at 350 degrees centigrade for 60 seconds to form a polyvinyl fluoride layer having a thickness of about 15 microns.

The multi-layered metallic pipe thus prepared was subjected to measurements similar to those of Example 1, and the results are enumerated in Table 2.

Comparison 2

The doubly wound steel pipe, as prepared as in Example 1, was plated on its outer circumference with the Zn film. On the outer circumference of the steel pipe having the Zn plated film, there was formed a polyamide resin layer having a thickness of 200 microns by adopting PA12 as the polyamide resin and by employing the extrusion-coating apparatus shown in FIG. 5.

The multi-layered metallic pipe thus prepared was subjected to measurements similar to those of Example 1, and the results are enumerated in Table 2.

TABLE 1

|  | Soft Chipping | Hard Chipping |
| --- | --- | --- |
| Air Pressure (Kgf/cm2) | 1 | 5 |
| Chip Size (mm) | 2.5 to 5 | 5 to 9 |
| Chipping Amount (g) × (frequency) | 500 × 1 | 500 × 5 |

TABLE 2

|  | No Chipping | Soft Chipping | Hard Chipping |
| --- | --- | --- | --- |
| Ex. 1 | 0 | 0 | 0 |
| Ex. 2 | 0 | 0 | 0 |
| Ex. 3 | 0 | 0 | 0 |
| Ex. 4 | 0 | 0 | 0 |
| Ex. 5 | 0 | 0 | 0 |
| Ex. 6 | 0 | 0 | 0 |
| Comp. 1 | 4.45 | 17.2 | 2190 |
| Comp. 2 | 0 | 0 | 1400 |

(n = 1, unit:ppm)

In Table 2, 0<Qualitative Limit.

According to the multi-layered metallic pipe and a method of coating the metallic pipe, as has been described hereinbefore, the defects such as the pin holes, if any in the first layer, can be remedied and prevented by the second layer from continuing so that the chipping and splashing resistances can be improved and so that an excellent corrosion resistance can be exhibited. Since the second layer is formed to have the stepped portions of different thicknesses, moreover, the second layer is thinned at a desired position, e.g., at the soft chipping portion receiving no pebble directly, the worked terminal portion, the portion to be clamped by the insulator, or the bent portion, so that the works of scraping the worked terminal portion can be eliminated to enhance the productivity. As a result, the clamping member such as the insulator of the prior art can be employed to spare the space so that the bending works can be performed with a small bending radius while lowering the production cost. Thus, it is possible to make the multi-layered metallic pipe and its coating method remarkably useful.

We claim:

1. A multi-layered metallic pipe comprising:

a metallic pipe having a relatively small diameter;

a plated film made of either one of zinc, aluminum, and a zinc/aluminum based alloy and formed on an outer circumference of said metallic pipe;

a first layer applied to said plated film and made of either one of a polyamide resin, a polyvinyl fluoride, and a polyvinylidene fluoride having a film thickness of 20 to 50 microns; and a second layer coating said first layer along an entire length of said first layer and made of an extrudible resin having a film thickness of 100 microns to 1.0 millimeter and a chipping resistance, wherein said second layer is formed to have stepped portions of different thicknesses.

2. A multi-layered metallic pipe according to claim 1, wherein said first layer is made of a combination of an epoxy resin primer or a double coating of either one of the polyvinyl fluoride and the polyvinylidene fluoride.

3. A multi-layered metallic pipe according to claim 1, further comprising:

a chromate coating applied to the surface of said plated film.

4. A multi-layered metallic pipe according to claim 1, wherein said plated film has an average thickness of 8 to 25 microns.

5. A multi-layered metallic pipe according to claim 1, wherein said first layer has a film thickness of 20 to 50 microns.

6. A multi-layered metallic pipe according to claim 1, wherein said second layer is made of polypropylene, polyethylene or a polyamide resin.

7. A multi-layered metallic pipe according to claim 1, wherein said second layer has a film thickness of 100 microns to 1.0 mm.

8. A method of coating a multi-layered metallic pipe, comprising:

the step of forming a first layer of a thin film of either one of a polyamide resin, a polyvinyl fluoride, and a polyvinylidene fluoride on an outer circumference of a metallic pipe which has been plated in advance with either one of zinc, aluminum, and a zinc/aluminum based alloy; and the subsequent step of forming a second layer of thick film having stepped portions of different thicknesses along an entire length of said first layer by extruding a resin having a chipping resistance at an intermittently different feed rate.

9. A method of coating a multi-layered metallic pipe according to claim 8, wherein said second layer is formed by coating said polyvinyl flouride in a single layer, by coating either one of the polyvinyl fluoride and polyviinylidene fluoride on an epoxy resin primer, or by coating the polyvinyl fluoride doubly.

10. A method of coating a multi-layered metallic pipe according to claim 8, further comprising:

the step of treating the surface of said plated film with chromate.

11. A method of coating a multi-layered metallic pipe according to claim 10, wherein the treated chromate layer is made yellow chromate or olive chromate.

12. A method of coating a multi-layered metallic pipe according to claim 8, wherein said plated film has an average thickness of 8 to 25 microns.

13. A method of coating a multi-layered metallic pipe according to claim 8, wherein said first layer has a film thickness of 20 to 50 microns.

14. A method of coating a multi-layered metallic pipe according to claim 8, wherein said second layer is made of polypropylene, polyethylene or a polyamide resin.

15. A method of coating a multi-layered metallic pipe according to claim 8, wherein said second layer has a film thickness of 100 microns to 1.0 mm.

16. A method of coating a multi-layered metallic pipe according to claim 8, wherein said first layer is coated by an extruding, spraying, showering, dipping, brushing or powder-coating method.

17. A method of coating a multi-layered metallic pipe according to claim 8, wherein said first layer and said second layer are simultaneously extruded in multiplicity.

18. A method of coating a multi-layered metallic pipe according to claim 8, wherein said plated film is formed by an electric plating method or a hot-dipping method.

* * * * *